Patented Dec. 21, 1926.

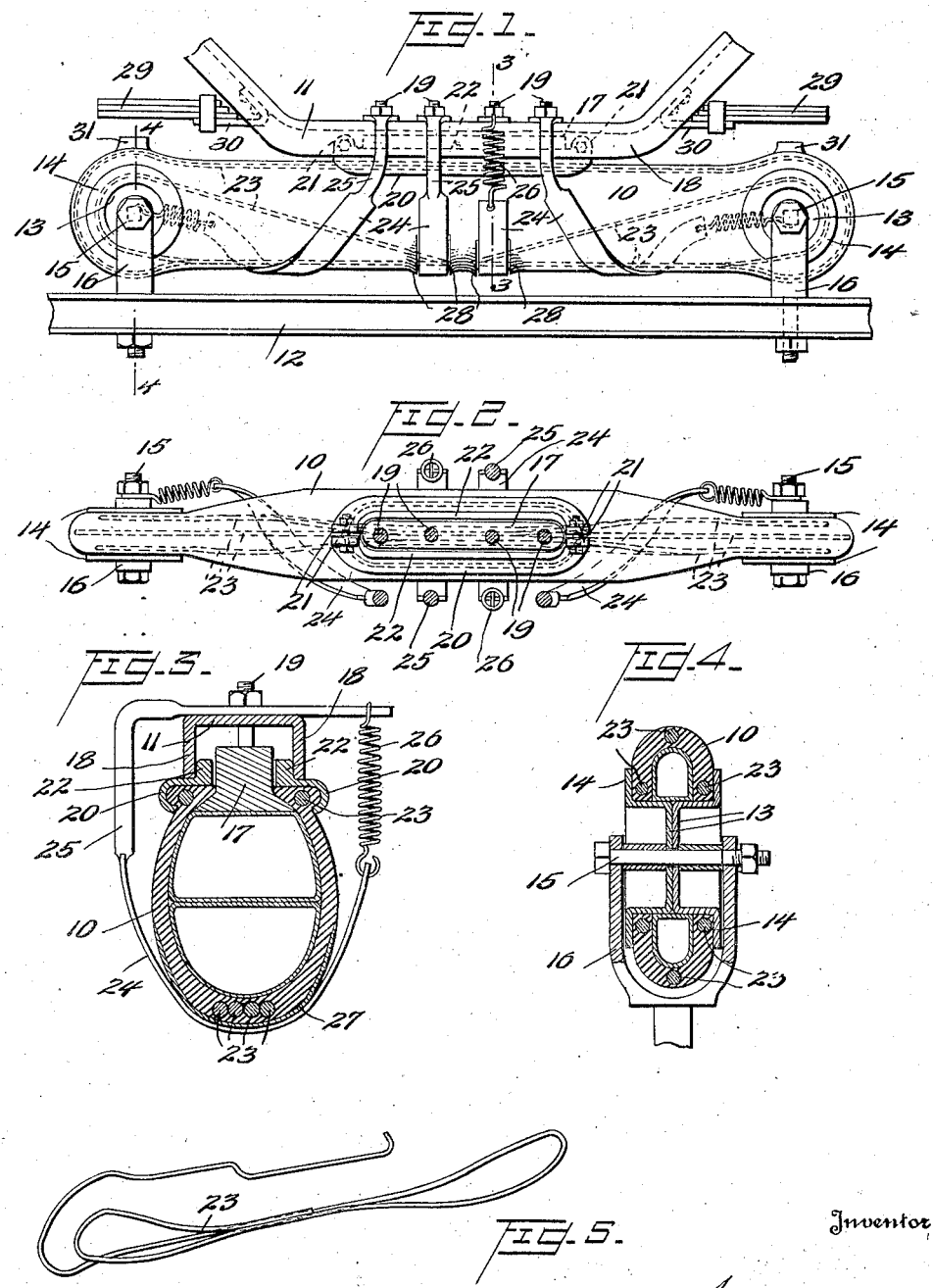

1,611,698

UNITED STATES PATENT OFFICE.

JULIUS VON WALDY, OF NEW YORK, N.Y.

VEHICLE SPRING SUSPENSION.

Application filed December 8, 1924. Serial No. 754,671.

My invention aims to provide an improved vehicle spring suspension and a snubber therefor adapted to check the vibrations and rebounds upon the vehicle encountering bumps or obstructions in a roadway, and this application involves improvements in my pneumatic spring suspension shown in my copending application Serial Number 710,445, filed May 1, 1924.

In the accompanying drawing wherein I have shown one illustrative embodiment of the invention—

Fig. 1 is a view in front elevation showing my improved suspension applied to a vehicle of a well known make;

Fig. 2 is a top plan view of the spring shown in Fig. 1;

Fig. 3 is a sectional view taken on the line 3—3 of Fig. 1;

Fig. 4 is a sectional view taken on the line 4—4 of Fig. 1; and

Fig. 5 is a perspective view of a reenforcing element suitable for use in the spring shown.

Referring now more specifically to the illustrative embodiment of my invention shown in the drawing I have provided a flexible, elastic, resilient and deformable beam 10 conveniently, though not necessarily, of the pneumatic type which is secured to the vehicle body 11 and to the axle 12 in substantially the same manner as is my spring shown in said prior application.

I have shown my spring as comprising a reenforced, vulcanized rubber casing having transverse openings near its ends to receive cup shaped supports 13 having flanges 14 for engaging the side walls of the casing. These cup-shaped supports are preferably all alike and have their bottom walls or webs arranged to abut against each other centrally of the casing. The bottom walls have square or noncircular perforations to accommodate bracket bolts 15 also of similar non-circular cross section throughout, except at their threaded ends engaging non-circular openings in the brackets 16 to prevent turning movement.

In Fig. 4 I have shown washers between the brackets and the webs 13 of the cups to facilitate clamping them on the casing.

That portion of the casing which is attached to the channel beam of the vehicle body is also somewhat similar to that shown in my prior application and comprises a block 17 having a projection to fit in between the channel beam flanges 18 and be secured to its web by suitable stud bolts 19 or the like. Around the beaded opening in the casing I have shown a longitudinally split rim 20 having bolted ears 21 at its ends for holding it in firm engagement with the enlarged lower end of the block 17 and having inner vertical flanges 22 arranged to fit snugly between the flanges of the channel beam to prevent play. Thus, when the block is secured to the channel web the rim 20 squeezes or clamps the casing between it and the enlarged lower end of the block 17.

To reenforce the casing so that it will resist undue distortions and deflections both horizontally and vertically upon the vehicle encountering obstructions, I have shown reenforcing wires 23, preferably one at one side of the casing and another at the other side. One of these reenforcing wires is preferably imbedded in the casing wall and looped around the cup-shaped supports 13 somewhat in the form of a figure 8 as shown in the perspective view (Fig. 5), one end of the wire which is shown at the bottom of the casing is brazed or otherwise secured to the adjacent strand of itself and the other end is extended from the brazed portion going around the casing in its closed continuous or integral end wall at one end and comes up in the top wall of the casing around the longitudinal opening for the block 17, being bent as shown in Fig. 5 to reenforce the bead in the casing.

The other reenforcing wire is similar to that just described except that the extension from the brazed portion runs in the opposite direction around the other end of the casing and those portions of both wires which reenforce the bead around the opening in the top of the casing are brazed or otherwise secured together at the ends of the opening. Thus, I have provided four adjacent reenforcing strands of wire in the bottom wall of the casing at the middle presenting branches which are secured together at the top forming, in effect, a continuous looped strand encircling the casing in such manner as to assist the beam in carrying its load and yet to permit it to have the desired flexibility and durability in service.

It is well known that pneumatic tubes are subject to violent vibrations upon striking obstructions, and to eliminate such vibrations in my improved spring I have shown a snub system comprising a series of flexible friction metal strips 24 encircling the casing at spaced intervals and secured to the channel beam by means of the stud bolts 19.

Conveniently, each of the snub strips may comprise a bar which is flattened where it embraces the casing and is round or strengthened to prevent flexibility above the casing engaging portion as shown at 25 in Fig. 3 wherein the bar is bent at a right angle to span the web of the channel beam 11 and project across it. The flattened ends of the two strips shown near the center of the spring are perforated to receive the hooked ends of spiral springs 26 also secured to the projecting ends of the top portions thereof, which span the channel shown at the right in Fig. 3 to take up the slack in the flexible strip portions when the casing is distorted downwardly, but upon recoil of the casing the strips will again tend to assume their normal positions causing them to slip on the casing wall and, through the friction, to check or reduce the objectionable recoil and the incident discomfort to passengers caused by bumping.

The springs 26 of the two snub strips near the middle are shown on opposite sides of the channel beam so that they counteract any tendency to twist the casing in the middle.

The outer two snub strips 24 perform the same function as the two middle ones shown and they are preferably wound spirally partly around the casing, being secured by coil springs to the ends of the bracket bolts 15. These snub strips, in addition, check lateral sway through the friction produced on the bottom and sides of the casing.

To increase the coefficient of friction between the snub strips 24 and the casing walls, I have shown twilled wicking or lining 27 imbedded in the outer walls of the casing, and to guide the strips over these linings I have shown raised flanges 28 integral with the casing wall. During the operation of the snub strips producing friction on the casing walls they tend to collapse it but this is effectively prevented by the wire cable reenforcement.

As another precaution to prevent undue side sway of the vehicle body I have shown multiple leaf springs 29 secured on suitable arms 30 projecting from the channel beam and the ends of these springs project over the ends of the spring to cooperate with bumpers 31 preferably formed integral with the casing. By this means the tendency of the vehicle to turn over sidewise is reduced.

From the foregoing description it will be seen that I have produced a relatively simple and very durable spring suspension that has all of the virtues of the metal leaf springs commonly employed with an additional cushioning effect that reduces the discomfort to passengers to a minimum, also I have eliminated shackle bolts and other ordinary spring suspension elements which require lubrication and which cause rattling of the chassis when they become worn.

Having thus described one illustrative example of my invention, but without intending in any way to limit myself thereto, what I claim and desire to secure by Letters Patent is:

1. A vehicle suspension comprising a flexible deformable beam connected to the vehicle axle and to the body and a friction device associated therewith to counteract recoil.

2. A vehicle suspension comprising a flexible deformable beam supporting the vehicle body on the axle and snub elements embracing the beam construction and arranged to retard the recoil of the beam by friction.

3. A vehicle suspension comprising a flexible deformable beam supporting the vehicle body on the axle, and a plurality of friction strips partially surrounding the beam arranged to retard recoil.

4. A vehicle suspension comprising a flexible deformable beam supporting the vehicle body on the axle, and a plurality of friction strips partially surrounding the beam arranged to retard recoil, some of said strips arranged spirally around said beam.

5. A vehicle suspension comprising an elongated, reenforced, pneumatic beam supporting the vehicle body on the axle, and a flexible strap embracing the lower side of said beam, said strap being rigidly supported at one side of the beam and yieldably supported at the other side whereby to cause the strap to slide over the lower surface of the beam in frictional engagement therewith to counteract recoil.

6. A vehicle suspension comprising a reenforced pneumatic beam between the body and the axle, a plurality of flexible metal strips partially surrounding the beam each presenting a part rigidly secured to the vehicle body above the beam and having a projection extending across said beam, the flexible portion terminating at the same side of the beam as the projecting end and a coil spring connecting the end of said flexible portion with said projecting end portion.

7. A vehicle suspension comprising a flexible deformable beam between the body and the axle and a pair of friction straps partially surrounding the beam each having a helical coil spring at one side of the beam yieldably to hold it in engagement with the bottom of the beam, one of said springs arranged on one side of the beam and the other arranged on the opposite side to counteract the tendency to twist the beam upon recoil.

8. A vehicle suspension comprising a flexible deformable beam supporting the body on the axle, a pair of friction bands partially surrounding and spirally embracing the beam and yieldably held in engagement therewith to counteract recoil.

9. A vehicle suspension comprising a flexible distortable beam supporting the body on the axle a friction band engaging the beam on recoil and a friction strip secured to the surface of the beam forming a lining engagement with said band.

10. A vehicle suspension comprising a flexible distortable beam between the body and the axle, a friction band engaging the beam on recoil, a friction lining imbedded in the surface of the beam to engage said band and integral flanges projecting from the beam forming guides for said band.

11. A vehicle suspension comprising a pneumatic elongated casing having a continuous wall supported near its ends on the vehicle axle and secured at its middle to the vehicle body a plurality of wire cable reenforcements arranged in substantially 8 shaped loops engaging the axle supports and embedded in the casing, the strands of said loops secured together in the bottom wall of the casing, one of the strands of each loop extended and surrounding one closed end of the casing extending into the top wall, said extensions projecting in opposite directions from said secured portions and being so arranged in the top wall as to form a reenforcing bead for that portion of the casing which is secured to the vehicle body, and means cooperating with the casing to retard recoil.

12. A vehicle suspension comprising an elongated flexible pneumatic casing secured near its ends to the vehicle axle and having a longitudinal opening in its top wall, a block having an enlargement projecting through said opening within the casing, means on the block for securing it to the vehicle body, a bead surrounding the opening and a longitudinally split rim having portions engaging the beads the parts being secured together at the ends over said beads, said block presenting a projection arranged to be inserted in a channel beam on the vehicle body and said rim presenting vertical flanges engaging the flanges of the channel to prevent lateral movement therein, said rim arranged to clamp the bead between it and said enlargement on the block incident to securing the block to the vehicle body.

13. A vehicle suspension comprising a flexible elongated pneumatic casing having closed ends and secured at its middle to the vehicle body, said casing having transverse openings near its ends and a pair of cup-shaped supports having flanges engaging the side walls of the casing projecting into said openings, said cup-shaped supports presenting webs having non-circular openings, brackets on the vehicle axle also having non-circular openings and non-circular bolts projecting through the openings in said brackets and supports for holding the supports in clamping engagement with the casing, said bolts adapted to prevent turning movement of the supports.

14. A vehicle having a flexible deformable, beam-like spring secured near its ends to the axle and presenting integral bumpers and spring arms secured to the body of the vehicle to cooperate with the bumpers and counteract side sway of the body.

JULIUS VON WALDY.